US009850873B2

(12) United States Patent
Henley

(10) Patent No.: US 9,850,873 B2
(45) Date of Patent: Dec. 26, 2017

(54) ENGINE PRE-HEATING SYSTEM AND METHOD FOR MULTIPLE VEHICLES

(71) Applicant: Allied Green Technologies, Inc., Smithville, MO (US)

(72) Inventor: Jesse H. Henley, Smithville, MO (US)

(73) Assignee: Allied Green Technologies, Inc., Smithville, MO (US)

( * ) Notice: Subject to any disclaimer, the term of this patent is extended or adjusted under 35 U.S.C. 154(b) by 501 days.

(21) Appl. No.: 14/512,866

(22) Filed: Oct. 13, 2014

(65) Prior Publication Data

US 2016/0102645 A1 Apr. 14, 2016

(51) Int. Cl.

*B60L 1/02* (2006.01)
*F02N 19/02* (2010.01)
*H05B 1/02* (2006.01)
*F02N 11/12* (2006.01)

(52) U.S. Cl.

CPC .......... *F02N 19/02* (2013.01); *H05B 1/0236* (2013.01); *F02N 11/12* (2013.01); *F02N 2200/122* (2013.01)

(58) Field of Classification Search

CPC .......... F02N 19/02; F02N 19/04; F02N 19/06; F02N 19/08; F02N 19/10; F02N 11/12; F02N 11/14; F02N 11/122; F02N 2200/023; F02N 2200/045; F02N 2300/00; F02N 2300/10; F02N 2300/103; F02N 2300/20; F02N 2300/2002; F02N 2300/2004; F02N 2300/2011; F02N 2300/302; H05B 1/0236; H05B 1/02

See application file for complete search history.

(56) References Cited

U.S. PATENT DOCUMENTS

| | | | |
|---|---|---|---|
| 3,877,639 A | 4/1975 | Wilson et al. | |
| 4,773,588 A | 9/1988 | Okada | |
| 4,836,444 A | 6/1989 | Kawamura | |
| 5,048,753 A | 9/1991 | Kellie | |
| 5,285,963 A | 2/1994 | Wakefield et al. | |
| 5,791,407 A | 8/1998 | Hammons | |
| 5,990,800 A | 11/1999 | Tamaki et al. | |
| 6,147,418 A | 11/2000 | Wilson | |
| 6,164,258 A | 12/2000 | Petrovich et al. | |
| 7,258,092 B2 | 8/2007 | Beaucaire et al. | |
| 7,274,007 B2 | 9/2007 | Fernandez et al. | |
| 7,899,609 B2 | 3/2011 | Rodrigues et al. | |
| 8,151,753 B2 | 4/2012 | Kamiyama et al. | |
| 2005/0211229 A1 * | 9/2005 | Pellizzari | F02D 41/003 123/525 |
| 2010/0063705 A1 | 3/2010 | Rodrigues et al. | |

* cited by examiner

*Primary Examiner* — Shawntina Fuqua
(74) *Attorney, Agent, or Firm* — Polsinelli PC

(57) ABSTRACT

An engine pre-heating system includes a housing that houses a climate control heating element and a controller configured in the housing. The controller generates an energizing signal for controlling an amount of electrical power provided to multiple engine heating elements that are thermally coupled to the engines of multiple vehicles. The controller also generates a climate control signal for controlling the climate controlled heating element to maintain the controller inside the housing within a specified temperature range. The energizing signal provided to the engine heating elements is inversely proportional to an ambient temperature proximate the engines.

20 Claims, 4 Drawing Sheets

ENGINE PRE-HEATING SYSTEM AND METHOD FOR MULTIPLE VEHICLES

TECHNICAL FIELD

Aspects of the present disclosure relate to climate controlled devices, and in particular, to an engine pre-heating system and method for multiple vehicles.

BACKGROUND

Engine heating elements, which are also referred to as block heaters, are devices used to pre heat engines in relatively cold climates when not in operation. In general, the engine heating elements replace core plugs (e.g., welch plugs, freeze plugs, engine block expansion plugs, etc.) of an engine and include a resistive element that generates heat when energized with electrical power. These engine heating elements are particularly useful in cold weather climates to maintain a minimum temperature level, thus alleviating detrimental effects, such as freezing of engine coolant of the engine that can permanently damage the engines, or increased difficulty of starting of the engine following a relatively long period of not being used.

SUMMARY

According to one embodiment of the present disclosure, an engine pre-heating system includes a housing that houses a climate control heating element and a controller configured in the housing. The controller generates an energizing signal for controlling an amount of electrical power provided to multiple engine heating elements that are thermally coupled to the engines of multiple vehicles. The controller also generates a climate control signal for controlling the climate controlled heating element to maintain the controller inside the housing within a specified temperature range. The energizing signal provided to the engine heating elements is inversely proportional to an ambient temperature proximate the engines.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; the emphasis instead is being placed on illustrating the principles of the technological concepts. Also, like reference characters may refer to the same components, features, and the like throughout the different views. The drawings depict only typical embodiments of the present disclosure and, therefore, are not to be considered limiting in scope.

DETAILED DESCRIPTION

Embodiments of the present disclosure provide an engine pre-heating system that includes a controller for simultaneously pre-heating the engines of multiple vehicles using a single climate controlled controller that adjusts the power provided to each engine according to a measured ambient temperature. While traditional engine pre-heating systems are mainly adapted for pre-heating of only one vehicle engine, the engine pre-heating system provides for the pre-heating of multiple vehicle engines in locations where climate control of its control system may not be inherently available, such as in a parking lot where multiple vehicles may be parked. Thus, whereas traditional engine pre-heating systems rely upon an existing climate controlled structure, such as a house, a commercial building, an inside compartment of the vehicle, or other form of housing structure to maintain the controller within acceptable operating temperatures, embodiments of the engine pre-heating system provides a climate controlled housing to ensure that proper operating temperature levels for the controller are adequately maintained.

Figure 1:
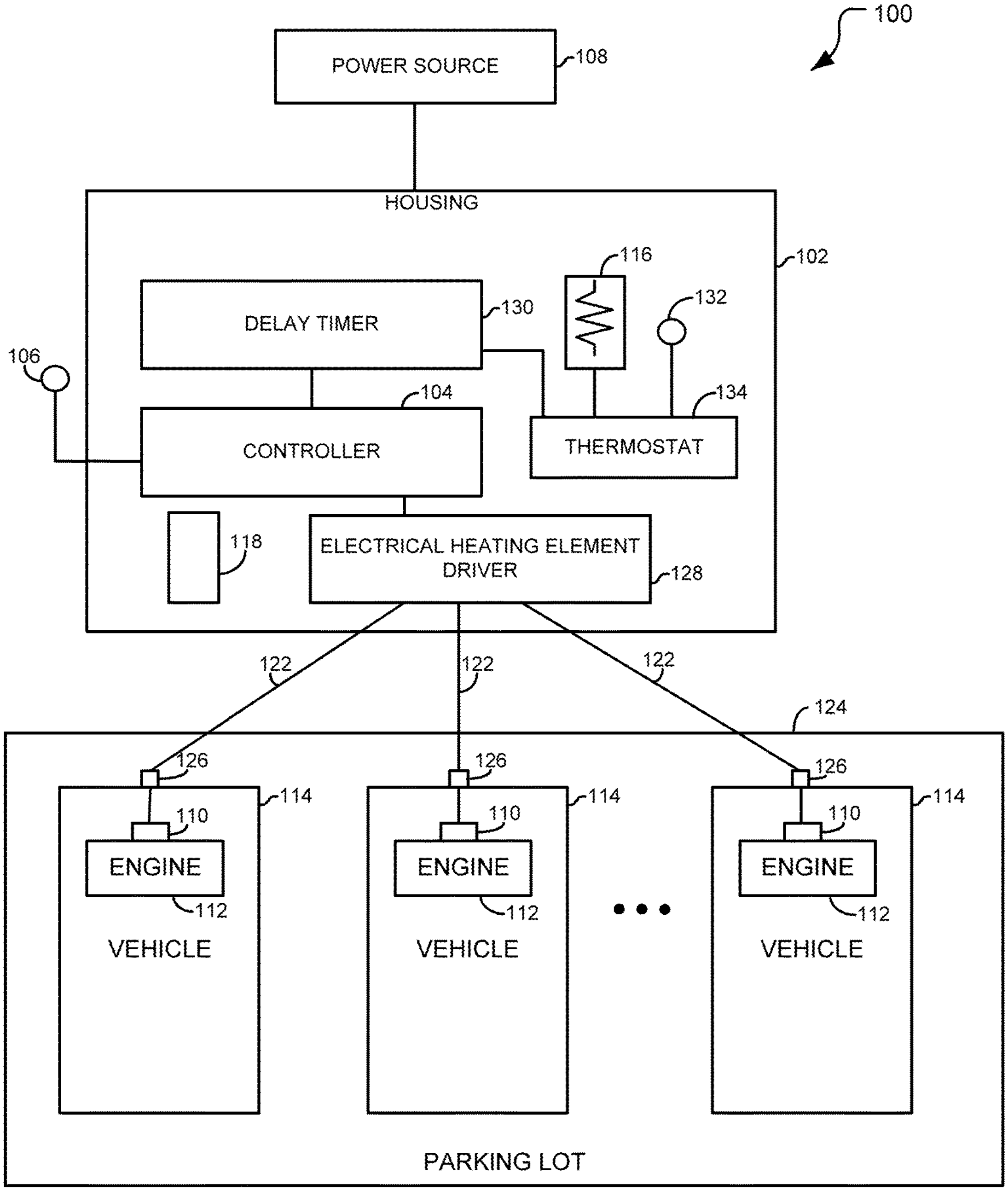
FIG. 1 illustrates an example engine pre-heating system according to one embodiment of the present disclosure.

FIG. 1 illustrates an example engine pre-heating system 100 according to one embodiment of the present disclosure. The engine pre-heating system 100 includes a housing 102 that houses a controller 104 that is coupled to, and receives a temperature signal from an ambient temperature sensor 106 external to the housing 102 for adjusting a level of electrical power provided from a power source 108 to multiple engine heating elements 110 configured on the engines 112 of multiple vehicles 114. Further, the housing 102 also houses an internal heater 116 that is controlled by a thermostat 134 for maintaining a specified temperature level for the controller 104 disposed within the housing 102. The housing 102 may also house a dehumidifier 118 to reduce humidity levels within the housing 102.

In general, the system 100 includes a weather proof housing 102 with a controller 104 for preheating one or more vehicles (e.g., a fleet of vehicles) in inclement weather. The controller 104 is programmable an may incorporate desired temperature parameters for allowing or disallowing electrical power to engine heaters of each vehicle. The design of the programmed parameters is to provide a pulse width modulated (PWM) control over power provided to the engine heaters to allow for longer cycles when temperatures are low and shorter cycles when temperatures are relatively higher, thus saving energy and consumer costs.

The housing 102 may be mounted in any location where the engines 112 of multiple vehicles may be serviced using one or more electrical power distribution lines 122. In the particular example shown, the housing is mounted proximate a parking lot 124 where the vehicles 114 are parked. Another example of a suitable location includes a construction site where multiple construction vehicles, such as dump trucks, backhoe devices, bulldozers, graders, and the like may be parked when not in use, such as overnight and after working hours. Another example includes a hotel or other commercial establishment having a parking lot where multiple patrons may park their vehicles during their overnight stay. Yet another example includes a parking lot for buses used by a public school system when not used for busing students to and/or from a school house.

In general, the housing 102 of the engine pre-heating system is placed at a suitable location where multiple vehicles may be situated. For example, the housing 102 may be mounted on a pole or placed on the ground proximate to a parking lot where multiple vehicles may be parked, while the electrical power distribution lines 122 have lengths sufficient to reach each vehicle without causing excessive power loss due to their inherent resistance. In a particular example in which electrical power provided to the engine heating elements 110 is a standard rated line power (e.g., 120 volts, 60 Hertz), the lengths of the electrical power distribution lines 122 may range from approximately 10 to 300 feet long to provide access the vehicle engines from the housing 102 without causing undue power loss due to excessive cabling length. Additionally, each electrical power distribution line 122 may be terminated with a connector 126 for ease of coupling and decoupling the engine heating elements 110 from the controller 104. In the particular case in which the engine pre-heating elements use standard rated line power, each connector 126 may comprise a National Electrical Manufacturers Association (NEMA) 1-15 receptacle, a NEMA 5-15 receptacle, or other suitable connector.

In one embodiment, the system 100 may also include multiple receptacles (not shown) disposed proximate the housing 102 to couple the distribution lines 122 to the driver 128 in the housing 102. In general, the multiple receptacles form an electrical plug-in station where users their own distribution line 122 to the system 100.

The ambient temperature sensor 106 may be mounted in any suitable location having an ambient temperature level that approximates that of the engines 112 to be pre-heated. According to one embodiment, the ambient temperature sensor 106 is mounted outside of the housing 102 and at a distance and orientation away from the housing 102 such that the heat radiated from the climate controlled housing 102 does not adversely affect the ambient temperature around the ambient temperature sensor 106 to any substantial degree. For example, if the housing 102 is mounted on a pole, the ambient temperature sensor 106 may be mounted approximately 12.0 inches away from and below the housing 102 such that heat radiated by the housing 102 is mainly directed upward and away from ambient temperature sensor 106. In this manner, the ambient temperature around the ambient temperature sensor 106 may accurately reflect the ambient temperature around the vehicle engines 112 to be pre-heated. Nevertheless, it should be understood that the ambient temperature sensor 106 may be mounted in any location having an ambient temperature approximating that of the vehicle engines to be pre-heated.

According to embodiments of the present disclosure, the engine pre-heating system 100 includes an internal heater 116 that is controlled by the controller 104 to maintain the space within the housing 102 at or above a specified temperature level, such as a minimum rated temperature level for the various components within the housing 102. For example, a particular controller that incorporates a computer-based microprocessor that executes instructions stored in a memory, the microprocessor and/or memory components of the controller may typically have a minimum operating temperature of approximately 35.0 degrees Ferinheight. Nevertheless, overnight winter conditions in many northern regions can often go well below this level, thus inhibiting proper operation of the controller. Embodiments of the present disclosure provide a solution to this problem, among other problems, using the internal heater 116 that heats the components of the controller 104 to a safe operating temperature, thus enabling its operation in locations where existing climate controlled environments are not readily available, such as next to a parking lot where multiple vehicles may be parked for an extended period of time.

The thermostat 134 may selectively apply electrical energy to the internal heater 116. In general, the thermostat 134 generates a climate control signal, which is used to control operation of the internal heater 116, according to receipt of the ambient temperature measurement via the ambient temperature sensor 106 and/or an internal temperature measurement via an internal temperature sensor 132. In one embodiment, the thermostat 134 generates the climate control signal according to receipt of the ambient temperature measurement via the ambient temperature sensor 106. For example, the thermostat 134 may generate a pulse width modulated (PWM) signal that is inversely proportional to the ambient temperature signal to approximate an amount of energy to maintain the inside of the housing 102 above a specified temperature.

The climate control signal is used to modify an amount of electrical energy provided to the internal heater 116 to compensate for these measured temperatures. The thermostat 124 may modify the electrical energy delivered to the internal heater 116 based upon the measured ambient temperature using the ambient temperature sensor 106, the internal temperature measurement acquired via the internal temperature sensor 132, or a combination of both.

The power source 108 may be any source of electrical power used to power the controller 104, internal heater 116, dehumidifier 118, and engine heating elements 110 configured on the vehicle engines 112. In one embodiment, the power source 108 is the same type of rated electrical power used by the engine heating elements 110. For example, if the engine heating elements 110 are rated for using the standard residential rated line power of 120.0 volts, 60.0 Hertz alternative current (AC), the power source 108 may be of that type. Conversely, if the engine heating elements 110 are rated for using 12.0 volts, direct current (DC) power, the power source 108 may be of that type. In another embodiment, the engine pre-heating system 100 includes a power converter (not shown) for converting the type of power provided by the power source 108 to that rated for use by the engine heating elements 110. For example, if he engine heating elements 110 are rated for using standard rated line power (e.g., 120.0 volts, 60 Hertz AC) and the power source 108 is 380 volt, 3-phase AC power, the adapter may be included for converting the 380 volt, 3-phase power to 120 volt, single-phase power used by the engine heating elements 110.

According to one embodiment, the engine pre-heating system 100 includes a dehumidifier 118 for reducing a level of humidity within the housing 102. In general, the dehumidifier 118 comprises a relatively low level heating device that maintains the space within the housing 102 at an elevated temperature to ensure that condensate does not form inside. The dehumidifier 118 may be continuously powered, be cycled on and off at a specified duty cycle, and/or may be controlled by the controller 104 and/or the thermostat 134 to maintain a specified humidity level inside of the housing 102 using a humidity sensor configured inside the housing 102. In a particular embodiment, the dehumidifier 118 comprises one marketed under the tradename GOLDENROD™, and manufactured by Battenfeld Technologies, Inc., which is headquartered in Columbia, Miss.

The housing 102 may be made of sheet metal, or other suitable material, which is formed into a shape, such as a box-like shape, to have a space that is accessible by a door for accessing the various components inside the housing 102. In other embodiments, the housing 102 may have any suitable shape for housing the various components while providing climate control for the components configured inside. Additionally, the inside surface of the walls of the housing 102 may be lined with a thermal insulating material, such as foam or fiberglass, for enhancing the thermal resistance of the space within the housing 102 from the outside environment.

The system 100 also includes one or more electrical heating element drivers 128 that function under control of the controller 104 to selectively power the engine heating elements 110. That is, the electrical heating element drivers 128 receive an energizing signal from the controller 104 and selectively apply electrical power from the power source 108 to the engine heating elements 110 according to the received energizing signal. For example, the electrical heating element drivers 128 may include one or more solid state relays that each uses a triode for alternating current (TRIAC) device for selectively applying electrical energy to the engine heating elements. Any number of electrical heating element drivers may be used that supplies ample current to power the desired number of electrical heating elements while remaining within their rated current capacity.

In one embodiment, the energizing signal comprises a pulse width modulating (PWM) signal having a duty cycle that increases as the ambient temperature decreases. In this case, the duty cycle represents an amount of time that the engine heating elements 110 are turned on (e.g., generating heat) relative to a second amount of time that the engine heating elements 110 are off (e.g., not generating any heat). For example, when the ambient temperature is measured to be 25 degrees Ferinheight, the controller 104 may generate the PWM signal having a 50 percent duty cycle (e.g., on for 30 minutes and off for 30 minutes), and when the ambient temperature is measured to be 12 degrees Ferinheight, the controller 104 may generate the PWM signal having a 75 percent duty cycle (e.g., on for 45 minutes and off for 15 minutes). The engine heating element drivers 128 may include any suitable type, such as one or more solid-state relays that switch on or off according to an input drive signal (e.g., the energizing signal). In one embodiment, the controller 104 can be programmed to accommodate varying climates. For example, the relative duty cycle may be increased for use in colder climates, such as Alaska, and be reduced for use in hotter regions, such as Texas.

The system also includes a delay timer 130 that measures the internal temperature of the housing 102 and withholds electrical power to the controller until the measured internal temperature is at a safe operating level for the other components (e.g., the controller 104, the electrical heating element drivers, etc.) in the system 100. For example, because it is not uncommon to experience extended power outages during severe inclement weather, such as a cold front in which temperatures may plummet to low levels, power to the system 100 may be lost for an extended duration such that the internal temperature of the housing goes below the safe operating temperature of its components. In such cases, the delay timer 130 functions to withhold the power from the controller and other components housed inside of the housing until safe operating temperatures are achieved.

The delay timer 130 may be any system that can selectively withhold electrical power to the internal heater 116 until a safe internal operating temperature is reached, and is capable of proper operation at any temperature that may be experienced inside the housing during an extended power outage. For example, the delay timer 130 may include components, such as one or more processors executing instructions stored in one or more memory units in which the processors and memory units are designed to function properly at relatively low temperatures. As another example, the delay timer 130 may include mechanical components that are designed to function properly at relatively low temperatures.

It should be appreciated that the components described in FIG. 1 merely depict one particular example of the engine pre-heating system, and other embodiments may take other forms and/or have more or fewer components then those described herein without departing from the spirit or scope of the present disclosure. For example, one or more of the components of the system (e.g., the delay timer 130) may be configured outside of the housing 102 if climate control for these components is not needed or desired. Additionally, although the energizing signal used to drive the engine heating element drivers 128 is described above as a PWM signal, other embodiments contemplate that an analog energizing signal may be used to control operation thereof. As yet another example, the system 100 may include a communication circuit, such as a wireless transmitter and receiver, for receiving instructions for manipulating operation from a remote location, and transmitting telemetry data associated with its operation back to the remote location.

Figure 2A:
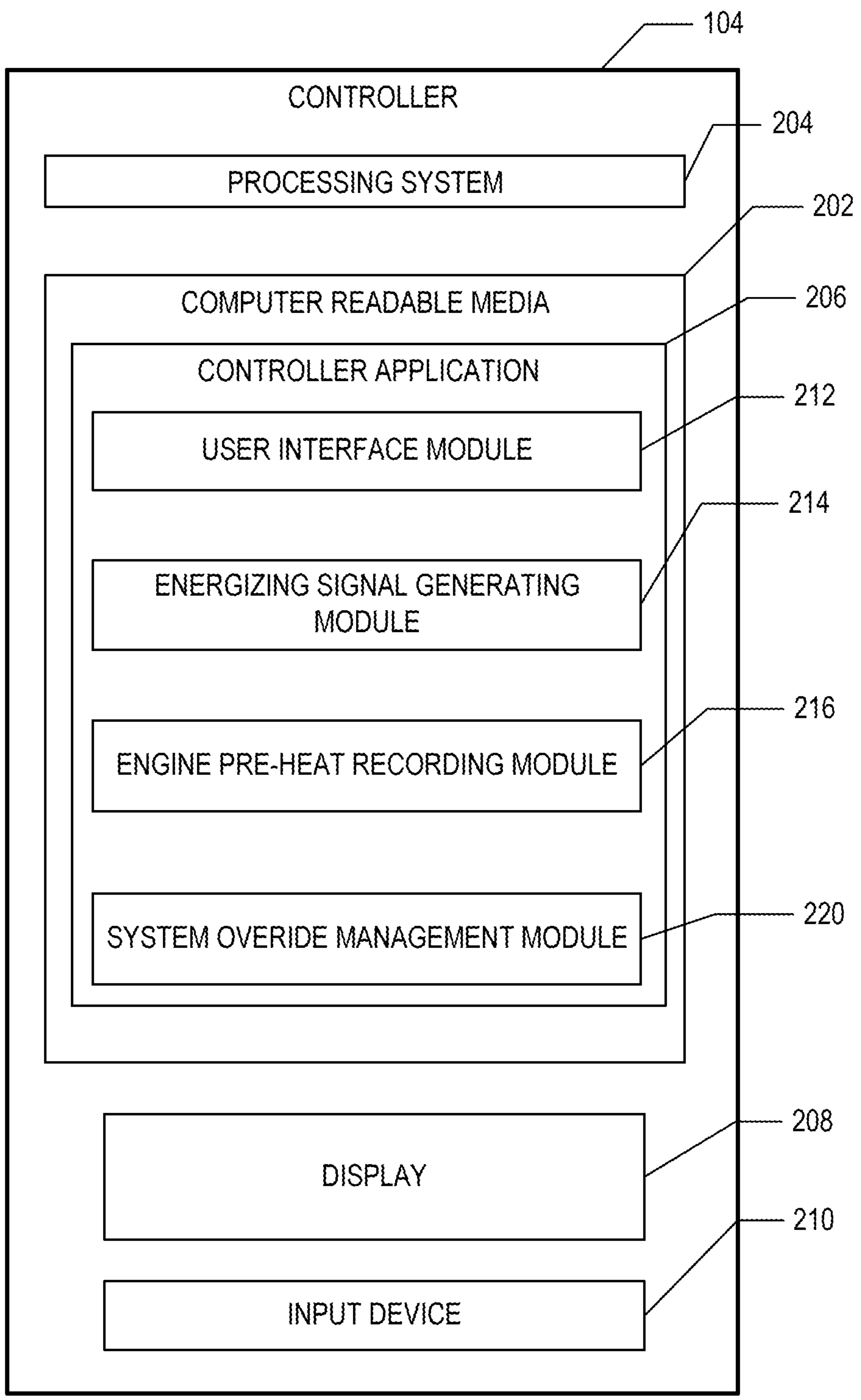
FIG. 2A illustrates an example controller of the engine pre-heating system according to the teachings of the present disclosure.

FIG. 2A illustrates an example controller 104 of the engine pre-heating system 100 according to the teachings of the present disclosure. The controller 104 includes a general purpose computing device, such as a computer executing computer-executable instructions stored in a computer readable media 202. The controller 104 includes a processing system 204 comprising one or more processors that execute a controller application 206 that is stored in the computer readable medium 202. A processor is hardware. Examples of such a controller include a personal computer, a mobile computer, or a dedicated controller modules, such as a logic module marketed under the tradename LOGO™, which is available from Siemens Corporation with its headquarters in Munich, Germany.

The computer readable media 202, which include both volatile and nonvolatile media, removable and non-removable media, can be any available medium that may be accessed by the general purpose computing device. By way of example and not limitation, computer readable media 202 may include computer storage media and communication media. Computer readable media 202 may further include volatile and nonvolatile, removable and non-removable media implemented in any method or technology for storage of information such as computer readable instructions, data structures, program modules or other data. Communication media may typically embody computer readable instructions, data structures, program modules, or other data in a modulated data signal, such as a carrier wave or other transport mechanism and include any information delivery media. Those skilled in the art will be familiar with the modulated data signal, which may have one or more of characteristics set or changed in such a manner that permits information to be encoded in the signal. The controller 104 may include or be capable of accessing computer storage media in the form of removable and/or non-removable, volatile and/or nonvolatile memory.

The controller 104 also includes a display 208, such as a liquid crystal display, for displaying data, and an input device 210, such as a keyboard or a pointing device (e.g., a mouse, trackball, pen, or touch screen) to enter data into or interact with the controller 104. A user may enter commands and information into the controller 104 using an input device 210. Other input devices, such as potentiometers or switches may also be connected to the controller 104. The controller 104 may also operate in a networked environment using logical connections to one or more remote computers.

As shown, the application 206 includes several modules for performing the various features of the engine pre-heating system 100 described herein.

A user interface module 212 facilitates the receipt of input data and/or output data from or to a user, respectively. For example, the user interface module 212 may also display one or more selectable fields, editing screens, and the like for receiving the user configuration information from the user for manipulating operation of the application 206. For another example, the user interface module 212 displays information associated with the operation of the application 206, such as a current measured ambient temperature value and/or a duty cycle value determined by the application 206 at that ambient temperature. The user interface module 212 may also interface with one or more switches or other user input mechanisms, such as potentiometers having dials that may rotated or otherwise manipulated by the user for modifying operation of system 100.

An energizing signal generating module 214 generates an energizing signal in accordance with a measured ambient temperature associated with the vehicle engines 112. In one embodiment, the energizing signal generating module 214 generates an energizing signal that is inversely proportional to the measure ambient temperature value. For example, the energizing signal generating module 214 may generate a PWM signal having a duty cycle that increases when the ambient temperature decreases. As another example, the energizing signal may be an analog signal representing a proportional level of electrical power from the power source 108 to be applied to the engine heating elements 110.

An engine pre-heat recording module 216 maintains an ongoing record of cumulative electrical energy consumed by the system 100 and provides this information to the user upon demand. For example, the engine pre-heat recording module 216 displays the result in response to a request from a user via the user interface module 212. As another example, the engine pre-heat recording module 216 stores the cumulative electrical energy consumed by the system 100 in a removable storage media, such as a universal serial bus (USB) stick memory, that may be temporarily removed and plugged into another computing device to access the information. For embodiments using a PWM energizing signal, the engine pre-heat recording module 216 maintains a resettable time counter that is incremented as long as the engine heating elements 110 are energized such that the cumulative energy consumed by the system 100 over a specified period of time may be calculated. In some embodiments, the engine pre-heat recording module 216 may also record power measurements received from a watt meter to automatically calculate the cumulative energy used by the system 100 over the specified period of time.

A system override management module 220 continually monitors the user interface module 212 for the presence of an override setting and overrides the controller to continually apply electrical power to the electrical distribution cables 122 when the override setting is set (e.g., active). In one embodiment, the system override management module 220 receives the override setting from a hardware switch (e.g., single pole, single throw switch) configured inside of the housing 102. In other embodiments, the system override management module 220 receives the override setting from any suitable input, such as via the user interface 212 of the controller. Embodiments of the override setting may be useful in cases where no extreme whether condition exists (e.g., extreme cold conditions) so that the electrical distribution cables 122 may be used for other purposes, such as powering one or more power tools around the parking lot where the vehicles may be otherwise parked.

It should be appreciated that the modules described herein is provided only as examples that perform the various features of the vehicle pre-heating system, and that other computing systems may have the same modules, different modules, additional modules, or fewer modules than those described herein. For example, one or more modules as described in FIG. 2A are combined into a single module. As another example, certain modules described herein are encoded on, and executed on one or more other computing systems.

Figure 2B:
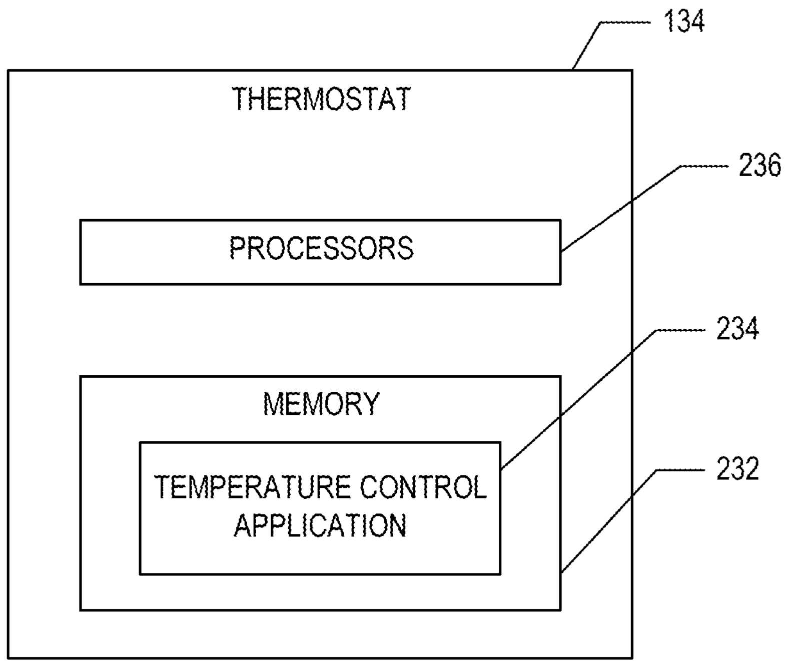
FIG. 2B illustrates an example thermostat of the engine pre-heating system according to the teachings of the present disclosure.

FIG. 2B depicts an example thermostat 134 according to the teachings of the present disclosure. The example thermostat as shown incorporates a computing device having a memory 232 for storing a temperature control application 234 that may be executed by one or more processors 236.

The computing device may be any suitable type. For example, the computing device can be a personal computer, such as a laptop or notebook computer, a workstation, or other processing device such as a personal digital assistant or a tablet computer. In a particular embodiment, the computing device include a single-chip controller device having one or more inputs for receiving an internal temperature signal from the internal temperature sensor 132 and one or more outputs for controlling operation of the internal heater 116.

The temperature control application 234 generates a climate control signal for energizing the internal heater 116 to maintain the inside of the housing 102 at or above a specified temperature level. The specified temperature level may include any level in which the various components within the housing 102 may be safely operated at. For example, if the components (e.g., controller 104 and electrical heating element drivers 128, etc.) have a minimum safe operating temperature of 35 degrees Ferinheight, the specified temperature may be set at 45 degrees Ferinheight to ensure that the minimum temperature level is maintained so that the components may be free from damage.

Although the particular example thermostat shown incorporates a computing device that executes a temperature control application 234 using a processor, it should be appreciated that the thermostat may be embodied in other specific forms without deviating from the spirit and scope of the present disclosure. For example, the thermostat 1xx may include a mechanical relay that opens as the sensed temperature increases and closes as the sensed temperature decreases. Additionally, the thermostat may be integrated in the controller 104 as shown in FIG. 1B such that the temperature control application 234 is stored in the computer readable media 202 and executed by the processing system 204 of FIG. 2A.

Figure 3:
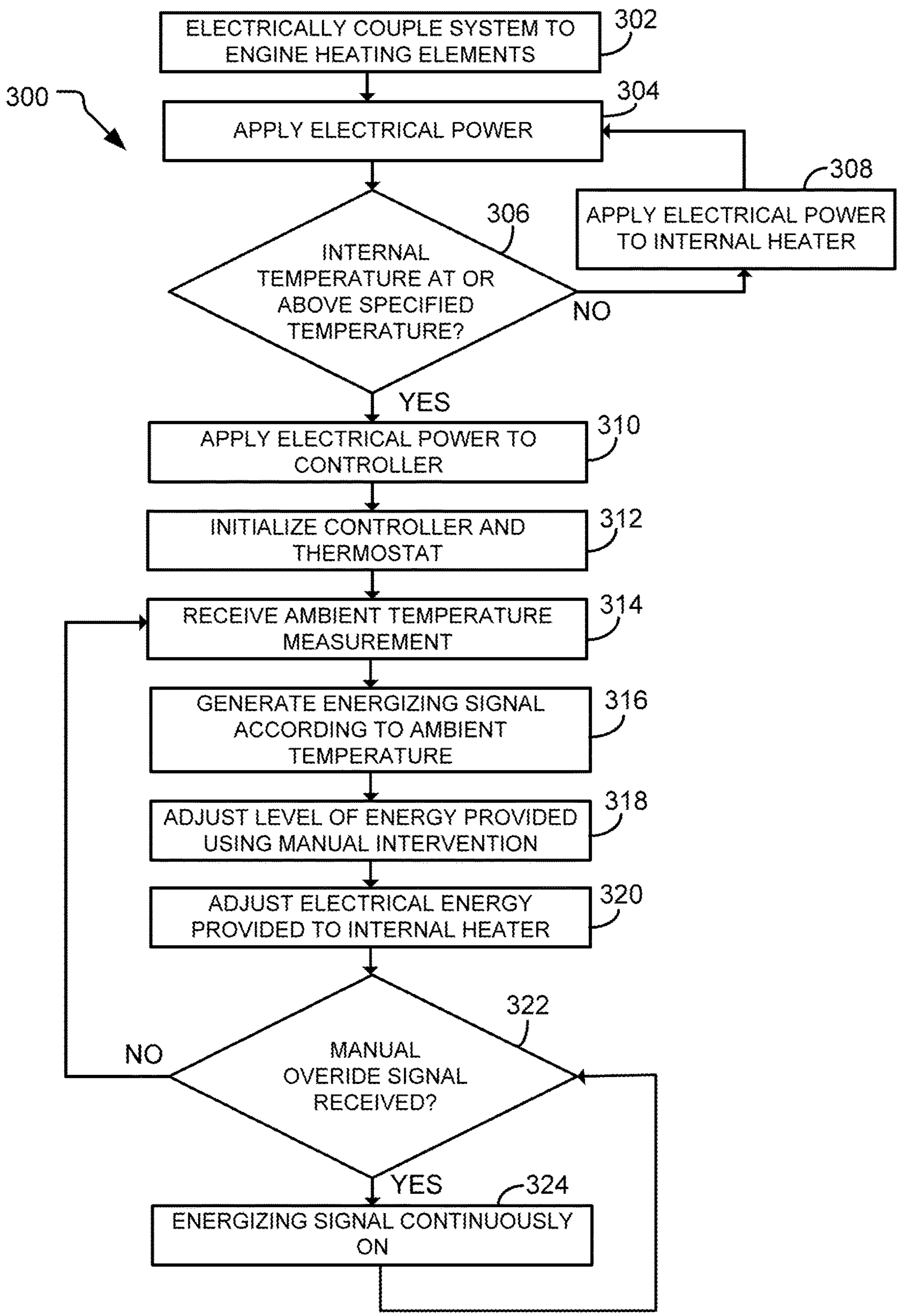
FIG. 3 illustrates an example process that may be performed by the system of FIG. 1 to pre-heat multiple vehicle engines according to one embodiment of the present disclosure.

FIG. 3 illustrates an example process that may be performed by the system of FIG. 1 to pre-heat multiple vehicle engines 112 according to one embodiment of the present disclosure.

In step 302, the system 100 electrical power distribution lines 122 are electrically coupled to the engine heating elements of multiple vehicle engines. To this end, the housing 102 with its associated components are placed in a location, such as a parking lot, where the vehicles may be accessed by the electrical power distribution lines 122. Thereafter, electrical power is applied to the system in step 304. That is, the power source 108 is electrically coupled to the delay timer 130.

In step 306, receives an internal temperature measurement of the temperature inside the housing to determine whether the internal temperature is at or above a minimum operating temperature for the components in the housing. If not, the delay timer 130 applies electrical power (step 308) to the internal heater 116 and continues at step 306 until the minimum rated operating temperature is reached.

In another embodiment, the delay timer 130 may wait for a specified period of time without regard for any internal temperature measurement of the temperature inside of the housing. For example, when initially turned on, the delay timer 130 may withhold electrical power to the controller and/or thermostat until a specified period of time, such as 1 hour, has elapsed. Additionally, the specified period of time may be manually set by a user to be greater than 1 hour or less than 1 hour.

Such functionality may be particularly useful for scenarios in which the power source 108 fails (loss of line power) for an extended period of time in extremely cold weather. However, when the minimum rated operation temperature is reached, processing continues at step 310 in which electrical power is applied to the controller 104 that assumes control over the operation of the system 100.

In step 312, the controller 104 and thermostat 132 are initialized. For example, initialization of the controller and/or thermostat may generally involve a process in which the controller 104 executes a sequence of executable instructions for booting its registers and other stateful components, loading the application 206 into the computer readable media 202, and initializing its execution.

In step 314, the application 206 receives a temperature measurement from the ambient temperature sensor 106, and generates an energizing signal in response to the received ambient temperature measurement in step 316. In one embodiment, the energizing signal comprises a PWM signal having a duty cycle that is inversely proportional to the measured ambient temperature. That is, the application 206 generates the PWM signal such that the amount of time that the engine heating elements are energized increases as the temperature decreases and vice-versa.

In step 318, the application 206 adjusts the relative level of energy provided to the engine heating elements 110 according to manual intervention provided by the user. For example, the application 206 may adjust the duty cycle of the PWM signal according to manual input received via the input device 210. The input device 210 may include any suitable mechanism for entry of a relative energy level adjustment, such as via a graphical user interface of the controller 104. In one embodiment, the input device 210 includes a potentiometer that is configured in a voltage divider circuit to generate an analog voltage that may be read by the application 206 to adjust the relative level of energy provided to the engine heating elements 110.

In step 320, the thermostat 134 adjusts a level of electrical energy provided to the internal heater 116 to maintain the components inside the housing 102 at or above a specified minimum rated operating temperature. In one embodiment, the thermostat 134 adjusts the level of electrical energy according. to ambient temperature measurements received from the ambient temperature sensor 106. For example, the thermostat 134 may use the ambient temperature measurement obtained from the ambient temperature sensor 106 for estimating a level of electrical energy to be provided to the internal heater to maintain the internal temperature of the housing above the specified temperature level.

In another embodiment, the thermostat 134 adjusts the level of electrical energy according to internal temperature measurements received from an internal temperature sensor 132 configured inside the housing 102. That is, whereas the thermostat 134 may use the ambient temperature sensor 106 to estimate a level of energy to be provided to the internal heater 116, the internal temperature sensor 132 may be used to form a closed-loop feedback system for controlling the temperature within the housing 102.

Certain embodiments incorporating the use of the ambient temperature sensor 106 for estimating a level of internal heating may provide advantages of reduced costs and lower complexity due to not requiring the internal temperature sensor 132, while other embodiments incorporating the internal temperature sensor 132 may provide other advantages of enhanced control over the internal temperature using a closed-loop feedback system.

In step 322, the application 206 determines whether a manual override signal has been received. Is so, processing continues at step 324 in which the application 206 generates the energizing signal such that the electrical cables are continuously on. Such a case may be useful in scenarios in which the electrical cables may be used for powering other devices, such as battery chargers, power tools, or other devices requiring the use of electrical power proximate the location where the housing 102 is positioned.

However, if the application 206 determines that the manual override signal is not received in step 322, processing continues at step 314 where control over the heating elements 110 of the vehicle engines, and the internal space within the housing 102 are maintained.

The previously described process continues throughout operation of the engine pre-heating system. Nevertheless, when use of the engine pre-heating system is no longer needed or desired, the process ends.

Although FIG. 3 describes one example of a process that may be performed by the system 100 for simultaneous pre-heating of multiple vehicles, the features of the disclosed process may be embodied in other specific forms without deviating from the spirit and scope of the present disclosure. For example, the system 100 may perform additional, fewer, or different operations than those operations as described in the present example. As another example, the steps of the process described herein may be performed by a computing system other than the controller 102, which may be, for example, the delay timer 130 configured inside of the housing 102.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An engine pre-heating system comprising:

a housing;

a climate control heating element for heating a space within the housing; and a controller configured in the housing and comprising at least one memory for storing a controller application that is executed on at least one processor to:

generate an energizing signal for controlling an amount of electrical power provided to each of a plurality of engine heating elements thermally coupled to a plurality of engines of a corresponding plurality of vehicles, the energizing signal being inversely proportional to an ambient temperature proximate the plurality of engines;

generate a climate control signal for controlling the climate controlled heating element to maintain the controller inside the housing within a specified temperature range.

2. The engine pre-heating system of claim 1, wherein the specified temperature range is at least greater than the minimum operating temperature of one or more components from which the controller is made.

3. The engine pre-heating system of claim 1, wherein the controller application that is executed to turn off the energizing signal when the ambient temperature reaches a specified temperature level.

4. The engine pre-heating system of claim 1, wherein the energizing signal comprises a pulse width modulating (PWM) signal having a duty cycle that is inversely proportional to the ambient temperature.

5. The engine pre-heating system of claim 4, wherein the controller comprises a proportional control mechanism for manually adjusting the duty cycle of the PWM signal.

6. The engine pre-heating system of claim 5, wherein the proportional control mechanism comprises a potentiometer that is accessible from inside the housing.

7. The engine pre-heating system of claim 1, wherein each of the engine heating elements comprise at least one of a block warmer, a block heater, a frost plug, and a freeze plug.

8. The engine pre-heating system of claim 1, wherein the controller application is further executed to:

obtain the ambient temperature from an ambient temperature signal generated by a temperature sensor positioned outside of the housing; and generate the energizing signal according to the ambient temperature measurement.

9. The engine pre-heating system of claim 1, wherein the controller application is further executed to:

generate the climate control signal according to a housing temperature obtained from a housing temperature sensor positioned inside of the housing.

10. The engine pre-heating system of claim 1, further comprising a delayed power control device that, at initial startup, supplies electrical power to the climate controlled heating element while withholding electrical power to the controller until the space within the housing reaches the specified temperature range.

11. The engine pre-heating system of claim 1, wherein the controller application is further executed to:

measure a cumulative time that the electrical power is applied to the engine heating elements;

store the measured cumulative time in the memory; and display the measured cumulative time on a user interface upon request from the user interface.

12. The engine pre-heating system of claim 1, further comprising a dehumidifier configured inside of the housing.

13. The engine pre-heating system of claim 1, wherein the controller application is further executed to receive a manual override signal, and generate the energizing signal that is continuously on according to the manual override signal.

14. An engine pre-heating method comprising:

generating, using at least one processor executing an application stored in at least one memory, an energizing signal for controlling an amount of electrical power provided to each of a plurality of engine heating elements thermally coupled to a plurality of engines of a corresponding plurality of vehicles, the energizing signal inversely being proportional to an ambient temperature proximate the plurality of engines; and generating, using the at least one processor, a climate control signal for controlling a climate controlled heating element to maintain the space within the housing within a specified temperature range.

15. The engine pre-heating method of claim 1, further comprising generating, by the at least one processor, the energizing signal comprising a pulse width modulating (PWM) signal that has a duty cycle which is inversely proportional to the ambient temperature.

16. The engine pre-heating method of claim 1, further comprising:

obtaining the ambient temperature from an ambient temperature signal generated by a temperature sensor positioned outside of the housing; and generating the energizing signal according to the ambient temperature measurement.

17. The engine pre-heating method of claim 1, further comprising:

generating the climate control signal according to a housing temperature obtained from a housing temperature sensor positioned inside of the housing.

18. The engine pre-heating method of Claim 1, further comprising at initial startup, supplying electrical power, using a delayed power control device, to the climate controlled heating element while withholding electrical power to the controller until the space within the housing reaches the specified temperature range.

19. The engine pre-heating method of claim 1, further comprising:

measuring a cumulative time that the electrical power is applied to the engine heating elements;

storing the measured cumulative time in the memory; and displaying the measured cumulative time on a user interface upon request from the user interface.

20. An engine pre-heating system comprising:

a controller configured in a housing and comprising at least one memory for storing a controller application that is executed on at least one processor to:

generate an energizing signal for controlling an amount of electrical power provided to each of a plurality of engine heating elements thermally coupled to a plurality of engines of a corresponding plurality of vehicles, the energizing signal inversely proportional to an ambient temperature proximate the plurality of engines;

generate a climate control signal for controlling a climate controlled heating element to maintain the space within the housing within a specified temperature range.

* * * * *